UNITED STATES PATENT OFFICE.

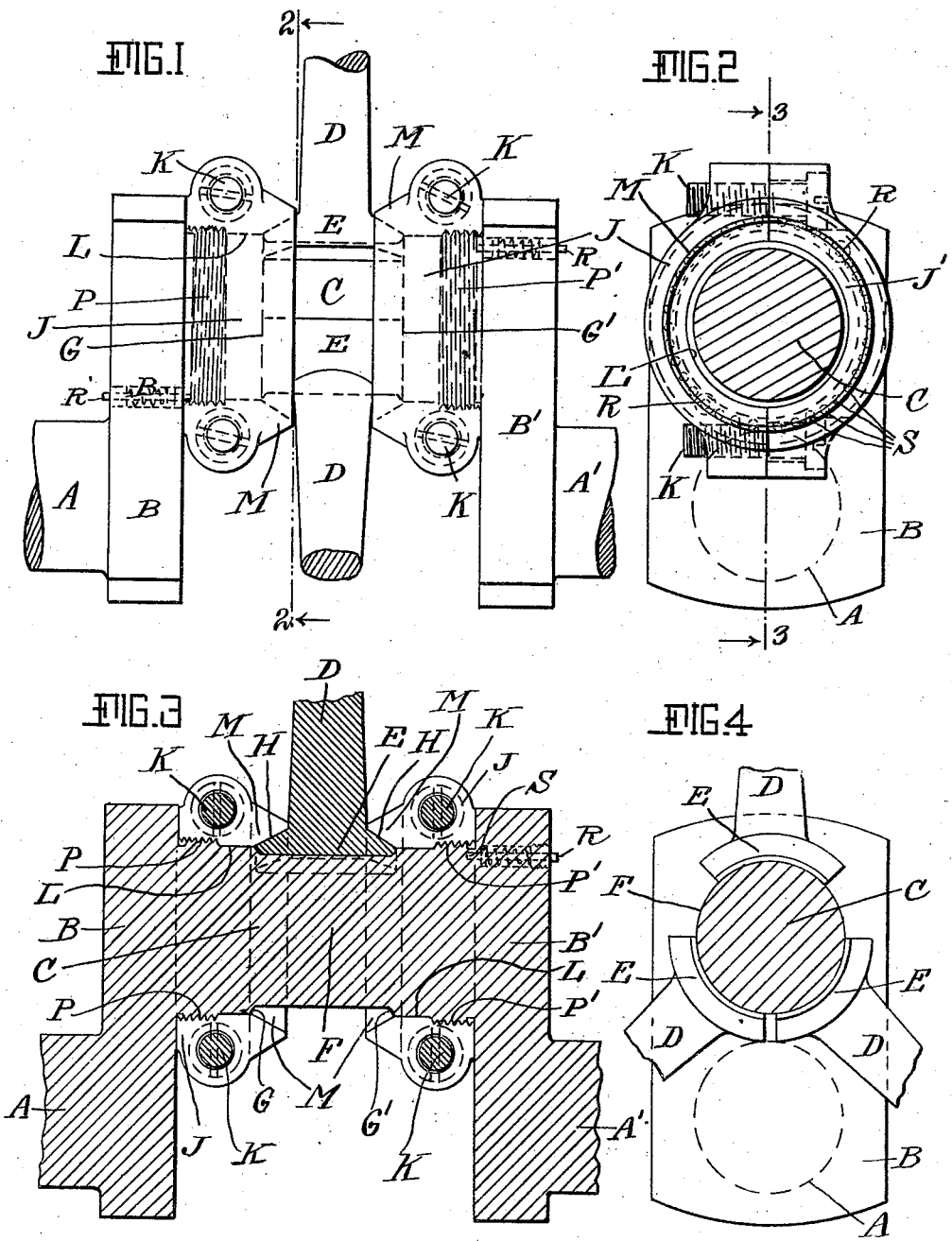

LARS ANDERSON, OF NEW YORK, N. Y., ASSIGNOR TO TRIPLEX GAS ENGINE COMPANY, OF NEW YORK, N. Y., A CORPORATION OF NEW JERSEY.

PISTON-ROD CONNECTION.

No. 859,795.      Specification of Letters Patent.      Patented July 9, 1907.

Application filed August 24, 1906. Serial No. 331,835.

*To all whom it may concern:*

Be it known that I, LARS ANDERSON, a citizen of the United States, residing at New York, county of New York, State of New York, have made a certain new and useful Invention in Piston-Rod Connections, of which the following is a specification.

This invention relates to piston rod connections, and, particularly, to means for connecting piston rods to the crank shaft of engines.

The object of the invention is to provide means which are simple and efficient for connecting piston rods to their crank shafts.

The invention consists substantially in the construction, combination, location and relative arrangement of parts, all as will be more fully hereinafter set forth, as shown in the accompanying drawing, and finally pointed out in the appended claims.

Referring to the accompanying drawing,—Figure 1, is a broken view, in side elevation, of a crank shaft, crank, and pin, showing the application of a piston rod connection embodying the principles of my invention. Fig. 2, is a view in section on the line 2, 2, Fig. 1, looking in the direction of the arrows. Fig. 3, is a broken view, in section, on the line 3, 3, Fig. 2, looking in the direction of the arrows. Fig. 4, is a broken view in section taken transversely of the crank pin.

The same part is designated by the same reference sign wherever it occurs throughout the several views.

The crank shaft A, A′, cranks B, B′, and crank pin C, are formed integrally or in one piece, with each other, in the usual manner of such constructions, or, if desired, the cranks and crank pin may be formed in one integral piece with each other, and the cranks then mounted upon and secured to the proximate ends of the shaft sections A, A′. The piston rod D, is provided at the end thereof with a segmental box member E, which is designed and adapted to bear against the cylindrical portion F of the crank pin. If desired, and, as shown, a number of piston rods may be employed, each having a segmental bearing member E, arranged to take bearing against the cylindrical portion F, of the crank pin. The bearing members E, should be of such length as to be received and to fit snugly between the shoulders G, G′, formed on the crank pin at the extremities of the cylindrical portion F, of such pin. The outer end surfaces H, of the segmental bearing members E, are tapered, as shown, and, where a number of piston rods are employed, they should be so relatively positioned around the crank pin, and the bearing members E, thereof, should be of such relative transverse dimension, as to permit the necessary oscillating movements of the piston rods in the operation of the engine. The crank pin is exteriorly threaded at each end thereof adjacent the points where the pin joins the cranks, as indicated at P, P′, the threads at one end of said pin being right handed while those at the other end are left handed. The diameter of that portion of the pin upon which the threads P, P′, are formed is somewhat greater than the diameter of that portion, of the pin formed by the shoulders G, G′, while the portion F, of the pin intermediate the shoulders G, G′, is of reduced diameter, as clearly shown.

Upon the threaded portions P, P′, are mounted collars, each formed in halves J, J′, and interiorly threaded to fit the threads on the crank pin. The parts or halves of the collars may be secured together in any convenient manner, as, for instance, by means of bolts K, passed loosely through openings formed in the ends of one half or section of the collar, and threaded into sockets or threaded openings formed in the ends of the other half or section, as shown. By turning the bolts K, the halves or sections of the collar may be clamped up tightly upon the threaded portion of the crank pin, or loosened thereon, or entirely removed, as may be desired.

Each collar is provided with a surface L, which forms a cylindrical bore adapted to take bearing upon the exterior cylindrical surface of the shoulders G, G′. Each collar is also provided with a flared or tapering flange M, adapted to inclose the tapering ends H, of the segmental bearing members and to efficiently clamp and hold said members in bearing contact with the crank pin, while at the same time permitting the necessary oscillation thereof in the operation of the engine. Any wear of the parts may be readily taken up by rotatively adjusting the collars. The collars may be held in the desired positions of rotative adjustment in any suitable or convenient manner, as for instance by spring pressed pins R, seated in openings formed in the cranks and adapted to engage in holes S, formed in the collars.

By providing the threaded portions P, P′, the one right and the other left handed, any tendency of the collars to work endwise along the threaded portions of the crank pin is prevented.

From the foregoing description it will be seen that I provide an exceedingly simple, inexpensive and efficient crank connection for the piston rods.

Many variations and changes in the details of construction and arrangement might readily suggest themselves to persons skilled in the art and still fall within the spirit and scope of my invention. I do not desire, therefore, to be limited or restricted to the exact details of construction and arrangement shown and described. But Having now set forth the object and nature of my invention and a construction embodying the principles thereof, what I claim as new and useful and of my own invention and desire to secure by Letters Patent is:—

1. The combination with a crank shaft, and a crank pin and cranks formed integrally with each other, the crank pin having exteriorly threaded portions, of a piston rod having a segmental box member adapted to bear against the pin, and collars mounted upon the threaded portions of the pin and engaging the ends of said segmental member.

2. A crank shaft crank and pin, said crank and pin being formed integrally with each other, and said pin having a cylindrical bearing portion and an adjacent portion of larger diameter than the diameter of the cylindrical bearing portion, thereby forming a shoulder, in combination with a piston rod having a bearing member with tapering ends, said bearing member adapted to bear against the cylindrical bearing portion of the pin, and to abut endwise against said shoulder and a collar mounted upon the enlarged portion of the pin and provided with a tapering flange to receive and clamp the tapering ends of the piston rod bearing member.

3. In a piston rod connection, a crank pin having a cylindrical bearing portion of reduced diameter, a cylindrical shoulder at each end of the bearing portion, and an exteriorly threaded portion, in combination with an interiorly threaded collar mounted upon a threaded portion of the pin and having a cylindrical bore to bear against the cylindrical surface of said shoulder, said collar having a flange, and a piston rod having an end piece to bear against the cylindrical bearing portion of the pin, the flange of said collar engaging over the end of said end piece to clamp and secure the same in place.

4. The combination with a crank shaft and integral cranks and pin, said pin having shoulders formed thereon and a cylindrical bearing portion intermediate said shoulders, said pin also being exteriorly threaded at the ends thereof, of an interiorly threaded collar for the threaded portion of each end pin, each collar having a flange, and a piston rod having a segmental bearing member adapted to bear against the cylindrical portion of the pin between said shoulders, the ends of said bearing member being encompassed by the flanges on said collars.

5. A crank pin having shoulders and exteriorly threaded portions at the ends thereof and a cylindrical bearing portion intermediate said shoulders, in combination with interiorly threaded collars made in separable sections adapted to be secured together upon the threaded portions of the pin, said collars having flanges, and piston rods having segmental box members to bear against the cylindrical bearing portion of the pin between the shoulders, the ends of said segmental members being received in and held in place by the flanges on said collars.

6. A crank pin exteriorly threaded at each end thereof and provided with a bearing portion intermediate the threaded portions, in combination with interiorly threaded collars each made in separable sections, bolts for clamping said sections together upon the threaded portions of said pin, said collars having flanges, and a piston rod having a segmental bearing member at the end thereof to bear against the bearing portion of the pin, the collar flanges engaging over the ends of said member to clamp the same in place.

7. A crank pin and cranks formed integrally with each other, said pin being exteriorly threaded at the ends thereof, and having a cylindrical bearing portion intermediate its threaded portions, in combination with collars made in sections, and interiorly threaded to fit the threaded portions of the pin, bolts passed loosely through openings in the ends of one of the collar sections and screwed into threaded openings in the ends of the other section, said collars having flanges, and a piston rod having a segmental box member at its end to bear against the bearing portion of the pin, the collar flanges engaging over the ends of said segmental member.

8. A crank pin having right and left exterior threads at the respective ends thereof, in combination with flanged, interiorly threaded collars, and a piston rod having a bearing member to engage and bear against the pin intermediate the threaded portions thereof, the ends of said member being encompassed by the flanges on said collars.

9. A crank pin and cranks formed integrally with each other, said pin exteriorly threaded at the ends thereof, and having shoulders and a reduced bearing portion intermediate said shoulders in combination with collars made in separable halves and interiorly threaded to fit the threaded portions of the pin, the ends of said halves having openings therethrough, the openings in the ends of one section or half of each collar being threaded, bolts received in said openings to clamp said halves together, said collars having flared collars to extend over the reduced bearing portion of the pin and a bore to bear upon the exterior surface of said shoulders, and a piston rod having a segmental member to bear on the reduced bearing portion of the pin, between the shoulders thereon, the ends of said member being inclosed by the flanges on said collars.

In testimony whereof I have signed my name to this specification, in the presence of two subscribing witnesses, on this 21st day of August A. D. 1906.

LARS ANDERSON.

Witnesses:
  S. E. DARBY,
  ALVA DEL CASTRO.